(12) United States Patent
Delga et al.

(10) Patent No.: US 8,432,308 B2
(45) Date of Patent: Apr. 30, 2013

(54) METHOD AND DEVICE FOR MONITORING RADIOALTIMETRIC HEIGHTS OF AN AIRCRAFT

(75) Inventors: Philippe Delga, Auzeville Tolosane (FR); Nour-Ed-Din Houberdon, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 208 days.

(21) Appl. No.: 13/020,965

(22) Filed: Feb. 4, 2011

(65) Prior Publication Data

US 2011/0199253 A1   Aug. 18, 2011

(30) Foreign Application Priority Data

Feb. 15, 2010 (FR) ...................... 10 51039

(51) Int. Cl.
*G01S 13/08* (2006.01)
(52) U.S. Cl.
USPC .......................... 342/120; 342/165
(58) Field of Classification Search ........... 342/120–122
See application file for complete search history.

(56) References Cited

U.S. PATENT DOCUMENTS

| | | | | |
|---|---|---|---|---|
| 5,410,317 | A * | 4/1995 | Ostrom et al. | 342/65 |
| 6,366,835 | B1 * | 4/2002 | Henderson | 701/4 |
| 6,462,703 | B2 * | 10/2002 | Hedrick | 342/120 |
| 6,507,289 | B1 * | 1/2003 | Johnson et al. | 340/970 |
| 6,744,401 | B2 * | 6/2004 | Hager et al. | 342/173 |
| 7,145,501 | B1 * | 12/2006 | Manfred et al. | 342/120 |
| 2003/0107499 | A1 * | 6/2003 | Lepere et al. | 340/945 |
| 2008/0243316 | A1 * | 10/2008 | Sacle et al. | 701/9 |
| 2009/0289834 | A1 * | 11/2009 | Devensky | 342/122 |
| 2011/0035080 | A1 * | 2/2011 | Murphy | 701/9 |

FOREIGN PATENT DOCUMENTS

FR  2697627  5/1994

OTHER PUBLICATIONS

R.N. Clark, C.J. Masreliez, J.W. Burrows, "A Functionally Redundant Altimeter," IEEE Transaction on Aerospace and Electronic Systems, vol. AES-12, No. 4, Jul. 1976, pp. 459-463, IEEE Service Center, Piscataway, NJ.
French Republic Institut National De La Propriete Industrielle, Preliminary Search Report, FR 1051039, Oct. 6, 2010 (2 pgs.).

* cited by examiner

*Primary Examiner* — Matthew M Barker
(74) *Attorney, Agent, or Firm* — Wood, Herron & Evans, LLP

(57) ABSTRACT

A method and device for monitoring radioaltimetric heights of an aircraft, the device including an auxiliary height generation device that generates an auxiliary reliability height of an aircraft. The device also includes a determination device that determines with the aid of this auxiliary height, an error in incoherent data which are received from two radioaltimeters. To this end, the most reliable reading from the radioaltimeters is determined and sent to a user device.

6 Claims, 2 Drawing Sheets

METHOD AND DEVICE FOR MONITORING RADIOALTIMETRIC HEIGHTS OF AN AIRCRAFT

TECHNICAL FIELD

The present invention relates to a method and a device for monitoring radioaltimetric heights on an aircraft, in particular a transport airplane.

BACKGROUND

A radioaltimetric height being provided by an on-board radioaltimeter, to be further described below, can be used for numerous systems on-board the aircraft, and including for critical systems such as the automatic piloting system or flight controls. In the case of an erroneous radioaltimetric height (given as valid, but having its value being false), the pilot could be led to manage a work overload, upon critical flight phases, linked to a landing.

A radioaltimeter is an avionic system having, as a function, to calculate the height of the aircraft at the vertical above the ground. This system is based on a pulse or ramp modulation at the vertical of the current position of the aircraft. More precisely a high frequency radioelectric source emits, from the aircraft, a modulated signal, and the measurement of the time separating such an emission from the reception of the ground echo, allows the distance (height) to be calculated with respect to the ground.

In particular, during an approach and landing phase of an aircraft, the radioaltimetric height aids to the follow-up of the vertical trajectory and to the upholding of the descent slope. It is used, generally and mainly, in managing mode engagements, laws of flight controls, and of the automatic piloting system, and becomes a primary parameter in the law managing the final flare-out before landing.

Generally speaking, the architecture to be used on aircrafts for providing a radioaltimetric height is structured around several radioaltimeters so as to ensure availability and integrity of the radioaltimetric height, according to the requirements of the functions of the aircraft, to which implementation it takes part.

In particular, a two radioaltimeter architecture (having each of them that transmits its measurements, for example, to two guiding systems, to two display systems, ...) allows to ensure an integrity and an availability of the height information, sufficient with respect to the needs.

However, some malfunctions resulting in an erroneous radioaltimetric height, can generate, even if they are detected, a work overload for the pilots, such as for example the need to manage a throttling up again, near the ground, before landing. Such malfunctions could correspond to an internal malfunction of a radioaltimeter or to particular external conditions that are to affect the radioaltimetric signal.

Nevertheless, there already are means for monitoring radioaltimetric heights that compare therebetween the data supplied by two radioaltimeters for the most critical flight phases, and that warn the crew should a difference occur (resulting in the aircraft being again under control) without however specifying the defective radioaltimeter. Such usual monitoring means do thus not allow to ensure an operational continuity of the approach through switching to the not defective radioaltimeter.

Moreover, such architecture does not supply any height information other than those generated by the radioaltimeters. Thus, should an error occur as a result of an origin common to the different radioaltimeters, no radioaltimetric height is available to be exploited on-board the aircraft.

The present invention relates to a method for monitoring radioaltimetric heights of an aircraft, allowing the above mentioned drawbacks to be overcome.

SUMMARY OF THE INVENTION

To this end, the method wherein two distinct radioaltimeters are received, respectively, a first and a second radioaltimeters heights relating to a same position of the aircraft, is remarkable according to this invention in that:

a) an auxiliary height is determined, by means of an auxiliary source being dissimilar and independent from said radioaltimeters, said auxiliary height being relative to the same position of the aircraft as said first and second radioaltimetric heights;

b) the coherence between said first and second radioaltimetric heights is checked; and c) should an incoherence occur between this first and this second radioaltimetric heights, using said auxiliary height, the most reliable amongst said first and second radioaltimetric heights is determined.

Advantageously, in an addition step d):

should a coherence occur between the first and the second radioaltimetric heights, said first and second radioaltimetric heights are transmitted to at least one user device; and should an incoherence occur between the first and the second radioaltimetric heights, the most reliable radioaltimetric height is transmitted to a user device and the other radioaltimetric height is considered as erroneous.

Preferably, the above mentioned steps of the method according to this invention are implemented repeatedly, using the first and second radioaltimetric heights repeatedly received from said radioaltimeters.

Moreover, advantageously, the method according to this invention allows to identify a defective radioaltimeter and to generate a breakdown message, in particular so as to facilitate maintenance operations.

By means of this invention, radioaltimetric heights are monitored using an auxiliary height to be calculated by means of an auxiliary source of the aircraft, that is independent from said radioaltimeters and that does not correspond to a radioaltimeter. Thus, should an error occur relating to one of the radioaltimetric heights, such an error does not affect the auxiliary height that can still be used for monitoring the data originating from the radioaltimeters.

Consequently, the method according to this invention allows to:

ensure an operational continuity during an approach always selecting the radioaltimetric height that is not affected by an error; and reduce operational impacts should erroneous radioaltimetric heights occur, and this without having any impact on the weight, the volume and the installation of systems of the aircraft, allowing to overcome the above mentioned drawbacks and more particularly, to make the detection of an erroneous radioaltimetric height more reliable.

Furthermore, advantageously, in step b):

the difference is calculated between said first and second radioaltimetric heights;

said difference is compared with a first threshold value; and it is considered that these first and second radioaltimetric heights are coherent if said difference is lower than said first threshold value for a period of confirmation; otherwise, it is considered that said first and second radioaltimetric heights are incoherent.

Additionally, advantageously, in step c):

c1) a first difference is calculated corresponding to the absolute value of the difference between one of said radioaltimetric heights and said auxiliary height;

c2) a second difference is calculated corresponding to the absolute value of the difference between the other one of said radioaltimetric heights and said auxiliary height;

c3) these first and second differences are compared therebetween; and c4) it is considered that the radioaltimetric height, for which the difference is the lowest, represents the most reliable radioaltimetric height.

In such a case, advantageously, in step c), in addition, the lowest difference is compared with a second threshold value, and in step d), the two radioaltimetric heights are transmitted to a user device, if such a lowest difference is higher than said second threshold value.

Within the scope of the present invention, said auxiliary source that is not a radioaltimeter, that is independent and distinct from said radioaltimeters and that is thus not theoretically submitted to the same breakdown origins, could correspond to all types of systems or set of systems available on-board the aircraft and able to supply a geometrical altitude.

In a preferred embodiment, a CTC (<<Computed Terrain Clearance>>) type auxiliary height is used, as an auxiliary height, being usually calculated and made available by EGPWS, T3CAS and AESS type monitoring calculators.

Generally, for determining such an auxiliary height, the following operations are performed, in step a):

the current altitude of the aircraft is determined, from measurements achieved by on-board means being associated with a satellite positioning system;

a data base is taken into account of the field being flown over, containing a decomposition of said field into a plurality of adjacent cells, each of which being associated to a corresponding altitude; and said auxiliary height is calculated, subtracting at the thus determined current height, the altitude of a cell originating from said data base, being representative of the current lateral position of the aircraft.

Alternatively or additionally, in step a), for an aircraft being in approach to an airport with a view to landing on a landing runway of said airport, an auxiliary height can be determined, corresponding to one of the following values:

a1) an altitude obtained from measurements carried out by on-board means being associated with a satellite positioning system, at which the altitude of the airport is subtracted;

a2) an altitude obtained from measurements carried out by on-board means being associated with a satellite positioning system and inertial data of the aircraft, at which the altitude of the airport is subtracted;

a3) a height obtained from, on the one hand, the sideways distance between the current position of the aircraft and the landing runway, along an approach segment, and on the other hand, from the angle of such an approach segment;

a4) one of the altitudes or heights obtained in steps a1), a2) and a3), for which the altitude of a cell originating from the data base of the field to be flown over is subtracted, being representative of the current lateral position of the aircraft.

The present invention further relates to a device for monitoring radioaltimetric heights of an aircraft, in particular a transport airplane.

According to this invention, said device of the type receiving from two distinct radioaltimeters a first and a second radioaltimetric heights relating to a same position of the aircraft, is remarkable in that it comprises:

means for determining an auxiliary height, using an auxiliary source being dissimilar and independent from said radioaltimeters, said auxiliary height being relative to the same position of the aircraft as said first and second radioaltimetric heights;

means for monitoring the coherence between said first and second radioaltimetric heights; and means for determining, should an incoherence occur between this first and this second radioaltimetric heights, using said auxiliary height, which one of said first and second radioaltimetric heights is the most reliable.

Said device can also comprise the two radioaltimeters generating respectively said first and second radioaltimetric heights.

Furthermore, the present invention further relates to an aircraft and/or an aircraft system, such as for example an automatic piloting system or a flight control and/or display system, comprising a device for monitoring radioaltimetric heights, such as the above mentioned one.

BRIEF DESCRIPTION OF DRAWINGS

The FIGS. of the appended drawing will better explain how this invention can be implemented. In these figures, like reference numerals relate to like components.

DETAILED DESCRIPTION

Figure 1:
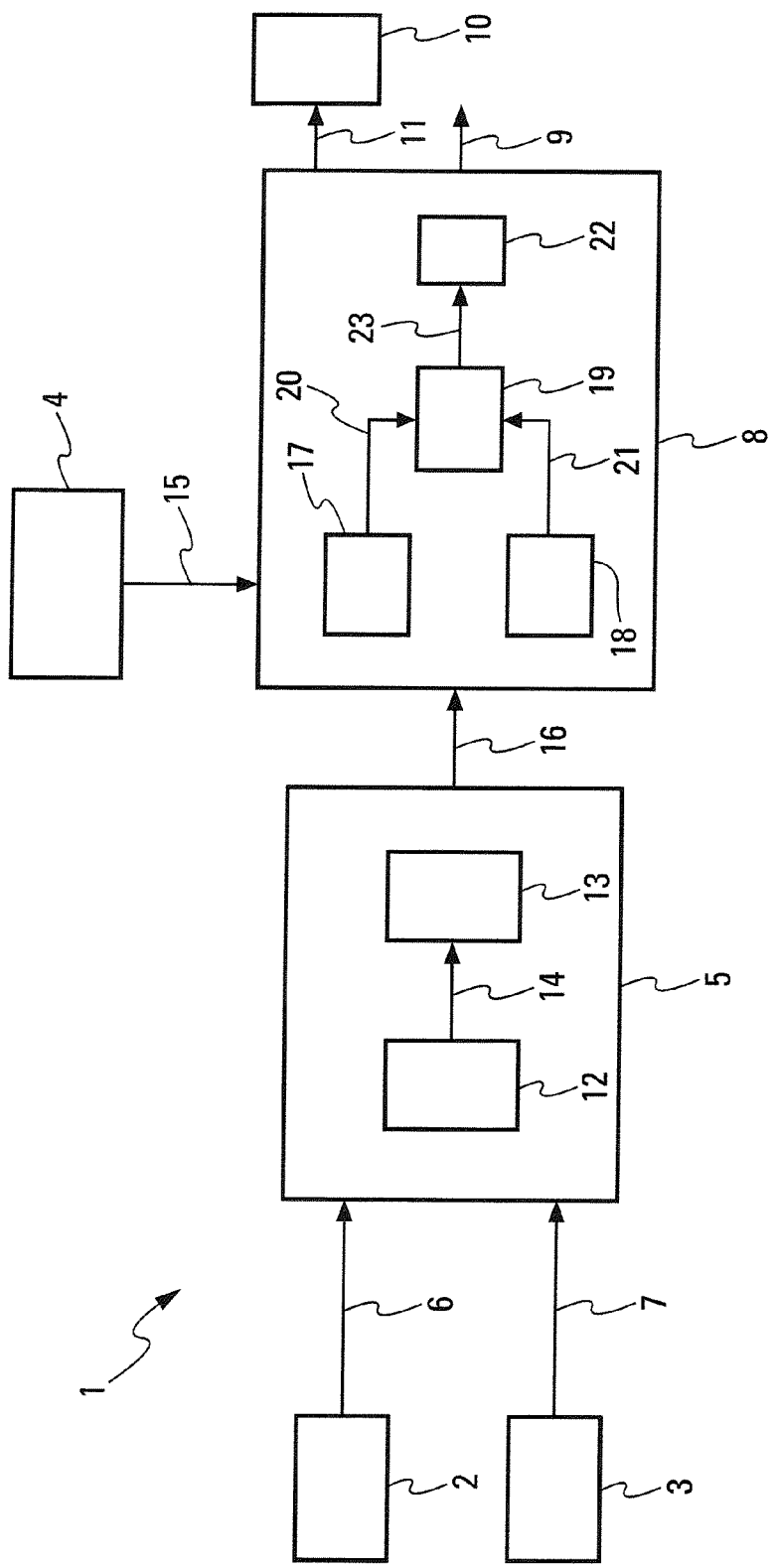
FIG. 1 is the block diagram of a device according to this invention.

The device 1 according to this invention and schematically shown on FIG. 1 is intended for monitoring the radioaltimetric heights H1 and H2 of an aircraft AC, in particular, of a transport airplane. Such radioaltimetric heights H1 and H2 are usually generated, respectively, by the radioaltimeters 2 and 3.

A radioaltimeter 2, 3 is an avionic system having, as a function, to calculate the height of the aircraft AC above the ground. This avionic system is based on a pulse or ramp modulation at the vertical of the current position of the aircraft AC. It comprises, more specifically, a high frequency radioelectric source emitting from the aircraft AC a modulated signal to the ground, means for measuring the time separating such an emission from the reception of the echo sent back by the ground, means for calculating, from such a measurement of the time, the distance of the aircraft AC from said ground.

According to this invention, said device 1 being on-board the aircraft AC, more specifically comprises:

means 4 for determining an auxiliary height HA being relative to the same position of the aircraft AC as the radioaltimetric heights H1 and H2 generated, respectively, by the radioaltimeters 2 and 3. Such means 4 comprise an auxiliary source being dissimilar and independent from said radioaltimeters 2 and 3, i.e. a source that does not correspond to a radioaltimeter and that has no link with the radioaltimeters 2 and 3;

means 5 for monitoring the coherence between the radioaltimetric height H1 and H2 respectively received from said radioaltimeters 2 and 3 via links 6 and 7; and means 8 for determining, using said auxiliary height HA, should an incoherence occur between the radioaltimetric heights H1 and H2, which one of said radioaltimetric heights H1 and H2 is the most reliable.

Moreover, said means 8 are formed so as to transmit, via a link 9, to at least one user device (not shown):
should a coherence occur between the radioaltimetric heights H1 and H2, said radioaltimetric heights H1 and H2; and
should an incoherence occur between the radioaltimetric heights H1 and H2, the most reliable radioaltimetric height, the other radioaltimetric height being then considered as erroneous.

When the means 8 consider that one radioaltimeter is defective, i.e. that the radioaltimetric height it emits is erroneous, the device 1 emits a breakdown message using the means 10 being linked via a link 11 to said means 8. Such means 10 can be means able to show, visually, the breakdown message to a crew member of the aircraft AC and/or to an operator in charge of the maintenance.

Furthermore, said means 5 comprise:
means 12 for calculating the difference between said radioaltimetric heights H1 and H2; and
means 13 for comparing such a difference (received via a link 14) to a threshold value S1.

Such means 13 consider:
that the radioaltimetric heights H1 and H2 are coherent, if said difference is lower than said threshold value S1, for example 300 feet (about 100 meters), for a period of confirmation T1; otherwise
that said radioaltimetric heights H1 and H2 are incoherent.

In addition, said means 8 being linked via links 15 and 16 respectively to said means 4 and 5 comprise:
means 17 for calculating a first difference D1 corresponding to the absolute value of the difference between one of said radioaltimetric heights H1 and H2 and said auxiliary height HA received from said means 4;
means 18 for calculating a second difference D2 corresponding to the absolute value of the difference between the other one of said radioaltimetric heights H1 and H2 and said auxiliary height HA;
means 19 being linked via links 20 and 21 respectively to said means 17 and 18 and being formed so as to compare, therebetween, this first and this second differences D1 and D2; and
means 22 being linked via a link 23 to said means 19 and being formed so as to identify, from this comparison, the radioaltimetric height H1, H2 that is erroneous. The means 22 consider that the radioaltimetric height, for which the difference D1, D2 is the lowest, represents the most reliable radioaltimetric height, and that the other radioaltimetric height is erroneous.

The device 1 according to this invention thus carries out the monitoring of the radioaltimetric heights H1 and H2 using an auxiliary height HA being generated using an auxiliary source (means 4) being independent from said radioaltimeters 2 and 3. Thus, should an error of the radioaltimetric heights Hi and H2 occur, this error does not affect the auxiliary height HA that can be still used for carrying out the monitoring of the data originating from the radioaltimeters 2 and 3.

Consequently, said device 1 enables:
to ensure an operational continuity during an approach always selecting the radioaltimetric height that is not affected by an error; and
to reduce operational impacts should erroneous radioaltimetric heights occur, and this without having any impacts on the weight, the volume and the installation of the systems of the aircraft AC, allowing to make the detection of an erroneous radioaltimetric height more reliable.

Said device 1 can further comprise said radioaltimeters 2 and 3. In a preferred embodiment, said device 1 is activated:
when the lowest value between H1 and H2 is located in a predetermined height field, for example between 1000 and 5000 feet; and
when the radioaltimetric heights H1 and H2 are valid.

Furthermore, said means 19 further compare the lowest difference (between D1 and D2) to a threshold value S2, and in a particular embodiment, the means 8 transmit the two radioaltimetric heights H1 and H2 to a user device, if this lowest difference is higher than said threshold value S2, for example 450 feet (about 140 meters) for a period of confirmation T2. Indeed, in such a situation, the auxiliary height HA could be erroneous and result in too high differences D1 and D2.

Within the scope of the present invention, said means 4 that are independent and distinct from the radioaltimeters 2 and 3 and that are thus not theoretically submitted to the same breakdown origins, could correspond to all types of systems or set of systems available on-board the aircraft AC and able to supply a geometrical altitude.

However, in a preferred embodiment, said means 4 comprise usual elements (not shown) for respectively:
determining the current altitude AL (schematically shown on FIG. 2 with respect to a fictitious line L illustrating the sea level) of the aircraft AC, mainly from measurements implemented by on-board means being associated with a GPS type (<<Global Positioning System>>) satellite positioning system; and
calculating said auxiliary height HA, subtracting at the thus determined current height AL, the altitude ALCc of a current cell Cc originating from a data base of the field T being flown over. Such a current cell Cc is representative of the current lateral position of the aircraft AC. Said data base contains a decomposition of said field T into a plurality of adjacent cells Ci, each of which being provided with a corresponding altitude ALCi.

Figure 2:
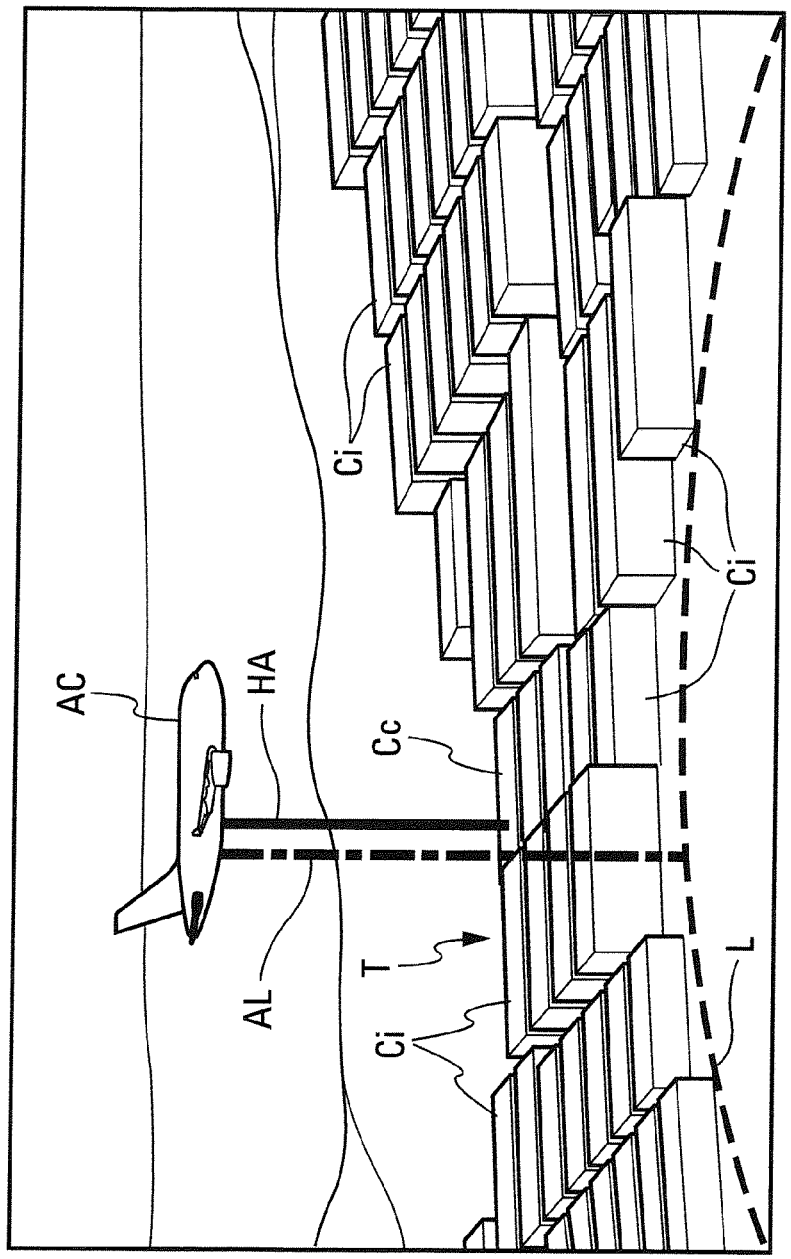
FIG. 2 is a schematic representation allowing a preferred mode for calculating an auxiliary height to be explained, that it used for implementing the present invention.

FIG. 2 shows an aircraft AC flying over a field T on which are schematically shown the cells Ci of such a data base, each cell Ci illustrating a corresponding altitude ALCi. As a current cell Cc, the one being laterally (in a horizontal plane) at the same position as the aircraft AC is taken into consideration, i.e. the one that vertically is located under the aircraft AC at a given time.

In this preferred embodiment, a CTC (<<Computed Terrain Clearance>>) type height is used as an auxiliary height HA, being calculated and made available, usually, by EGPWS, T3CAS and AESS type monitoring calculators.

Alternatively or additionally, said means 4 could further determine, for an aircraft AC being in approach to an airport (with a view to landing on a landing runway of said airport), an auxiliary height HA, corresponding to one of the following values:
a1) a GPS altitude (obtained from measurements carried out by on-board means being associated with a satellite positioning system), at which the altitude of the landing airport should be subtracted being made available via a data base of a FMS type (<<Flight Management System>>) flight management system or after a value QNH has been selected at the transition altitude, and this, mainly in the case of a flat field before reaching the landing runway;
a2) a GPIRS altitude (obtained from, on the one hand, measurements carried out by on-board means being associated with a GPS type satellite positioning system, and, on the other hand, inertial data of the aircraft AC), at which the altitude of the landing airport should be subtracted, made available via a data base of the FMS type flight management system or after the value QNH has been selected at the transition altitude, and this mainly in the case of a flat field upstream the landing runway;

a3) a height HDME obtained from, on the one hand, the sideways distance DME between the current position of the aircraft AC and the landing runway, along an approach segment, and on the other hand, from the angle generated by such an approach segment with the horizontal.

For determining the auxiliary height HA, the means 4 could also take into consideration one of the previous altitudes or heights defined in items a1), a2) and a3), for which the altitude ALCc of the current cell Cc originating from the above mentioned data base of the field to be flown over is taken into consideration, and not the altitude of the landing airport.

It is to be noticed that the threshold values S1 and S2, as well as the periods of confirmation T1 and T2, used by the means 5 and 8 are not strictly defined, but could be refined, so as:

to limit switching from one radioaltimeter 2, 3 to the other, being not defective; and to omit the shortcomings of the data base of the field.

Moreover, the threshold values S1 and S2 could vary and depend on the current height of the aircraft AC.

In a particular embodiment, said device 1 is directly integrated into one or more systems (not shown) of the aircraft AC, being linked to the radioaltimeters 2 and 3. It could further be integrated into an automatic piloting system, or a flight control and/or display system. Preferably, a plurality of such devices 1 is provided, being integrated respectively into a plurality of such systems of the aircraft AC. An application of such a type allows to ensure the logics coherence for the set of considered systems, linked to the radioaltimeters 2 and 3, and thereby to ensure some homogeneity in the cockpit of the aircraft AC.

The invention claimed is:

1. A method for monitoring radioaltimetric heights of an aircraft, wherein from two distinct radioaltimeters, respectively, a first and a second radioaltimetric height are received relative to a same position of the aircraft, the method comprising:
   (a) determining an auxiliary height, using an on-board auxiliary source that is dissimilar and independent from the radioaltimeters, the auxiliary height being relative to the same position of the aircraft as the first and second radioaltimetric heights, and for determining the auxiliary height, the following operations are carried out:
      (a1) determining the current altitude of the aircraft from measurements carried out by on-board devices;
      (a2) receiving data from a data base of the field being flown over the database containing a decomposition of the field into a plurality of adjacent cells, each of which is associated with a corresponding altitude; and
      (a3) calculating the auxiliary height by subtracting from the thus determined current altitude, the altitude of a cell originating from the data in the data base, being representative of the current lateral position of the aircraft;
   (b) checking the coherence between said first and second radioaltimetric heights; and
   (c) should an incoherence occur between the first and second radioaltimetric heights, determining the most reliable radioaltimetric height of the first and second radioaltimetric heights using the auxiliary height; and this determining including the following operations:
      (c1) calculating a first difference corresponding to the absolute value of the difference between one of the radioaltimetric heights and the auxiliary height;
      (c2) calculating a second difference corresponding to the absolute value of the difference between the other one of the radioaltimetric heights and the auxiliary height;
      (c3) comparing the first and second differences; and
      (c4) determining that the radioaltimetric height, for which the difference is the lowest, represents the most reliable radioaltimetric height;
   (d) transmitting at least one of the radioaltimetric heights to at least one user device by performing the following operations:
      (d1) should a coherence occur between the first and the second radioaltimetric heights, transmitting the first and second radioaltimetric heights to the at least one user device; and
      (d2) should an incoherence occur between the first and the second radioaltimetric heights, transmitting the most reliable radioaltimetric height to the at least one user device and the other radioaltimetric height is considered as erroneous.

2. The method of claim 1, wherein step (b) includes the following operations:
   (b1) calculating the difference between the first and second radioaltimetric heights;
   (b2) comparing the difference with a first threshold value; and
   (b3) determining that the first and second radioaltimetric heights are coherent if the difference is lower than the first threshold value for a period of confirmation; otherwise, determining that the first and second radioaltimetric heights are incoherent.

3. The method of claim 1, wherein, in step (c), the lowest of the first and second differences is compared with a second threshold value, and wherein, in step (d), the two radioaltimetric heights are transmitted to the at least one user device, if the lowest difference is higher than the second threshold value.

4. The method of claim 1, wherein the steps (a)-(d) are implemented repeatedly, using the first and the second radioaltimetric height received repeatedly from the radioaltimeters.

5. A device for monitoring radioaltimetric heights of an aircraft, the device receiving from two distinct radioaltimeters first and second radioaltimetric heights relative to a same position of the aircraft, the device comprising:
   an auxiliary height generation device configured to determine an auxiliary height, using an auxiliary source being dissimilar and independent from the radioaltimeters, the auxiliary height being relative to the same position of the aircraft as the first and second radioaltimetric heights, the auxiliary height generation device comprising elements configured to respectively:
   determine the current altitude of the aircraft from measurements carried out by on-board devices;
   retrieve data from a data base of the field being flown over, the data base containing a decomposition of the field into a plurality of adjacent cells, each of which is associated with a corresponding altitude; and
   calculate the auxiliary height by subtracting from the current altitude, the altitude of a cell originating from the data in the data base, being representative of the usual lateral position of the aircraft;

a coherence monitoring device configured to monitor the coherence between the first and second radioaltimetric heights; and a determination device configured to determine, should an incoherence occur between the first and second radioaltimetric heights, using the auxiliary height, which one of the first and second radioaltimetric heights is the most reliable, the determination device including elements configured to respectively:

calculate a first difference corresponding to the absolute value of the difference between the first radioaltimetric height and the auxiliary height;

calculate a second difference corresponding to the absolute value of the difference between the second radioaltimetric height and the auxiliary height;

compare the first and second differences; and determine that the radioaltimetric height, for which the difference is the lowest, represents the most reliable radioaltimetric height; and a transmission device configured to transmit:

should a coherence occur between the first and the second radioaltimetric heights, the first and second radioaltimetric heights to at least one user device; and should an incoherence occur between the first and the second radioaltimetric heights, the most reliable radioaltimetric height to the at least one user device, the other radioaltimetric height being considered as erroneous.

6. An aircraft comprising:
two distinct radioaltimeters; and
the device claim 5.

* * * * *